Aug. 11, 1964 W. GROOTEBOER 3,144,640

FERRITE MATRIX STORAGE

Filed Aug. 3, 1959 3 Sheets-Sheet 1

INVENTOR.
W. GROOTEBOER

BY Robert Harding Jr.

ATTORNEY

INVENTOR.
W. GROOTEBOER
BY Robert Harding Jr.
ATTORNEY

Aug. 11, 1964 W. GROOTEBOER 3,144,640

FERRITE MATRIX STORAGE

Filed Aug. 3, 1959 3 Sheets-Sheet 3

INVENTOR.
W. GROOTEBOER

BY Robert Harding Jr.

ATTORNEY

United States Patent Office 3,144,640
Patented Aug. 11, 1964

3,144,640
FERRITE MATRIX STORAGE

Wilhelm Grooteboer, Duisdorf, Bonn, Germany, assignor to International Standard Electric Corporation, New York, N.Y., a corporation of Delaware Filed Aug. 3, 1959, Ser. No. 831,235
Claims priority, application Germany Aug. 7, 1958
1 Claim. (Cl. 340—174)

The present invention relates to ferrite matrix storages in which the column or line-noise pulses are compensated for by connecting one of the two call-up pulses (semi-writing or semi-reading pulses) simultaneously to two line or column wires with an opposite transitional sense. In the case of matrix storage devices, which are composed of several such matrices, it has been found impossible to carry out this inhibition in the conventional manner by means of one inhibition wire.

The present invention is now based on the problem of providing a ferrite matrix storage in which this possibility of the inhibition is provided, and which yet has all advantages of prior known arrangements, in particular the saving of switching devices and the parallel conduction of the reading wire.

According to the invention this problem is solved in that each matrix of the storage device is subdivided in two semi-planes, and is wired in such a way that the one call-up pulse will simultaneously pass through a line or column wire of the one semi-plane in the one transitional sense and through a corresponding line or column wire of the other semi-plane in the opposite transitional sense, and one inhibition wire is provided for the inhibition of the call-up processes with one partial loop for each of the two semi-planes, and is connected in such a way that the inhibition pulses can only be applied to the partial loop of the called-up semi-plane. Preferably, in the case of compensating for the column or line-noise pulses, the inhibition wire is conducted in parallel with the line or column wires respectively. Furthermore it is appropriate for those of the two partial loops of the inhibition wire, assigned directly on the one hand, and, on the other hand, via one transformer, assigned respectively to each semi-plane, to be connected to ground for the feeding-in of inhibition pulses. In addition thereto the inhibition wire may simultaneously be used as a reading wire.

This design of ferrite matrix storages according to the invention is particularly advantageous with respect to the construction of storage devices with a high storage capacity. In the case of a large number of lines or columns the number of the required connecting-through devices will be reduced. In the case of a construction employing several matrices, in which all of the matrices are called-up simultaneously, it is possible, by way of the inhibition, that the call-up process will only become effective in one or in several of the called-up matrices.

The above-mentioned and other features and objects of this invention and the manner of attaining them will become more apparent and the invention itself will be best understood by reference to the following description of an embodiment of the invention taken in conjunction with the accompanying drawings, in which.

The difficulties in compensating for the column or line noise pulses by means of a single inhibition wire will be described in the following with reference to FIG. 1. In this drawing a ferrite matrix storage device is shown comprising four line wires 1–4 to which the call-up pulses may be fed via the transformers U3–U6. According to a known arrangement, in this matrix storage the column wires *a*, *b*, *c*, *d* are connected with each other in pairs in such a way that the call-up pulses may be fed to two neighboring column wires with an opposite transitional sense.

In this way the column wires *a* and *b* together with the output winding of a transformer U1, and the column wires *c* and *d* together with the output winding of a transformer U2 constitute a closed circuit. The reading wire L is conducted in parallel with the line wires, and is coupled inductively with the line wires via a transformer U7 for the compensation of the line noise pulses. The call-up pulses can be fed to the line and column wires via the inputs *e*1 through *e*6 and the corresponding transformers. The reading signal (read-out signal) can be taken-off at the output *a*, and can be fed to a reading (read-out) amplifier.

Figure 1:
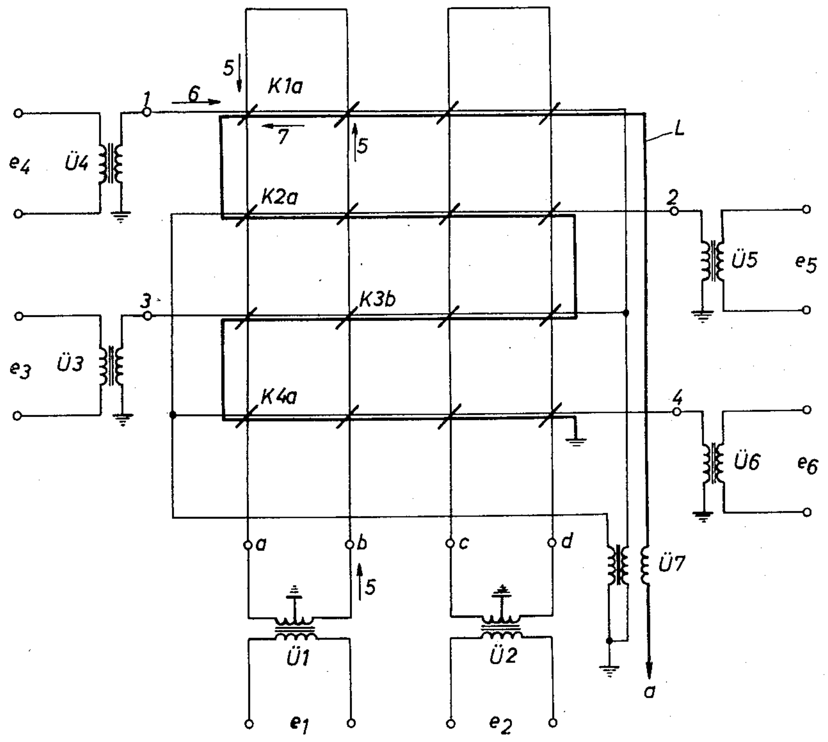
FIG. 1 shows a ferrite matrix storage of a known arrangement.

In order to show that no inhibition is possible in this arrangement of FIG. 1, it is assumed that the inhibition wire extends in the same way through the rows as the reading wire L. If now, for example, the core K1*a* is to be selected, then corresponding call-up pulses would have to be fed to the row or line wire 1 and to the column wire *a* in the direction as indicated by the arrows 5 and 6, so that the core K1*a*, in the case of a coincidence of these pulses, will be resaturated. If this resaturation is to be prevented by an inhibition pulse, then simultaneously with the line and column call-up pulses, an inhibition pulse would also have to be applied in the direction as indicated by the arrow 7. However, it will be immediately recognized that thereby the desired effect will not be achieved, because this inhibition pulse would coincide with the column semi-pulse at the cores K2*a*, K3*b* and K4*a*, and would resaturate these cores. The same difficulty will appear when the inhibition wire does not extend in parallel with the lines or rows, but in parallel with the columns.

Figure 2:
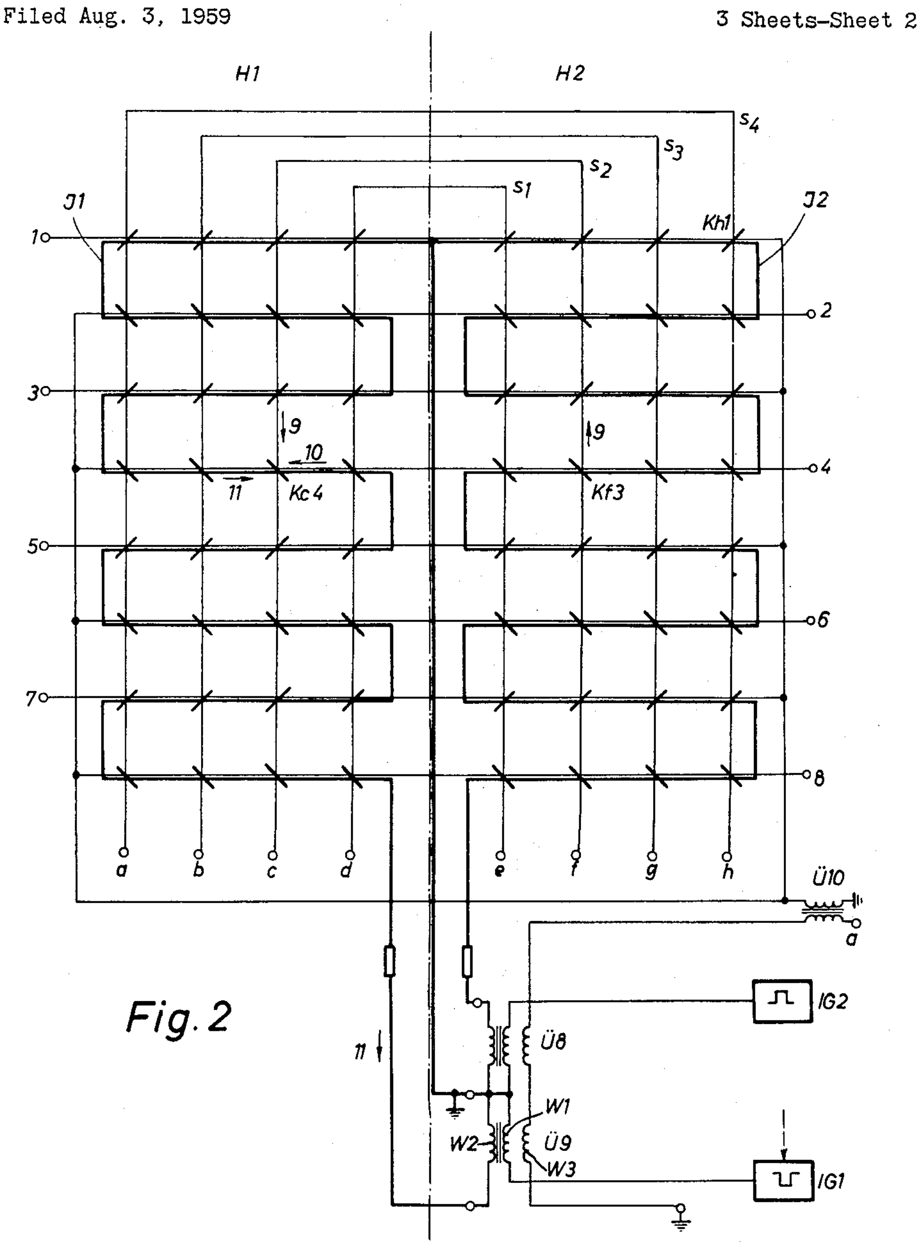
FIG. 2 shows a ferrite matrix storage comprising a common inhibition and reading wire.

As an example of a storage arrangement according to the invention, a storage device comprising eight row wires 1–8 and eight column wires *a*–*h* is shown in FIG. 2. The inhibition wire which is threaded in parallel with the rows, forms two partial loops J1 and J2, the first one of which passes through the left-hand portion, and the second one of which passes through the right-hand portion of the matrix. The two portions or parts of the matrix constitute the semi-planes H1 and H2. By means of the bridges *s*1–*s*4, one column wire of the one semi-plane is connected with a column wire of the other semi-plane, e.g., *a* with *h* by way of *s*4, *b* with *g* by means of *s*3, etc. The transformers serving the coupling-in of the call-up pulses are not shown in FIG. 2. They are to be connected analogously in the same way as in the arrangement according to FIG. 1, that is, that, e.g., the column wires *a* and *h* are applied to the output winding of a common transformer, so that the call-up pulses will be fed to the column wires *a* and *h* with an opposite transitional sense.

As is further shown in FIG. 2, this ferrite matrix storage according to the invention is built up in such a way that for each semi-plane of the matrix one transformer U8 and U9 is provided, and is so connected that the first winding W1 as a primary winding for inhibition pulses, is connected with an inhibition generator, and that the second winding W2, as a secondary winding for inhibition pulses, or as a primary winding for reading signals, is connected with the corresponding partial loop of the inhibition wire, and in that the third winding W3 of both transformers of the matrix, are connected in series and are connected with the output for the reading signals. In the circuit arrangement according to FIG. 2, the winding W1 of the transformer U9 is connected with the inhibition-pulse generator 1G1, and the winding W1 of the transformer U8 is connected with the inhibition-pulse generator 1G2. The two other ends of these windings are connected together to ground. The winding W2 of the transformer U9 is connected with the loop J1 of the inhibition wire, and the winding W2 of the transformer U8 is connected with the loop J2. The two other ends of these windings W2 are likewise connected to ground. The series connection consisting of the windings W3 of the two transformers U8 and U9 is connected on one hand to ground and, on the other hand, via a winding of the transformer U10, to the output *a* for these signals.

The transformer U10 is provided for compensating the row-noise pulses. The other winding of this transformer is connected on one hand with ground and, on the other hand, with row wires.

In this circuit arrangement the inhibition wire simultaneously performs the function of the reading wire. In order that the inhibition pulses will be prevented from simulating reading signals, the amplifier for the reading signals is blocked during the storing or inhibition in the conventional manner and is only unblocked during the read-out.

The compensation of the noise pulses is in accordance with known procedure. Since two columns are being simultaneously passed through by the call-up pulses in an opposite transitional sense, the column-noise pulses actually annul each other. The row-noise pulses are compensated via the transformer U10. Another possibility for suppressing the noise pulses consists in that the amplifier is opened during the read-out process only after a certain time delay, so that the noise pulses, which with respect to time, are shorter than the useful or signal pulses, will be prevented from passing through the amplifier, so that the latter will only amplify the useful signal.

The mode of operation of the ferrite storage matrix, according to the invention and as regards the storing and reading, is the same as in conventional storages. If now the effect of a storing process is to be inhibited, then an inhibition pulse is coupled-in via that particular one of the two transformers U8 and U9 which is assigned to that particular semi-plane in which the call-up process is supposed to take place. If, for example, the core K*c*4 is to be called-up, then the call-up pulses are to be applied to the row wire 4 and to the column wire *c* in the direction as indicated by the arrows 9 and 10. If the corresponding core K*f*3 should be called-up in the semi-plane H2, then the direction of the column pulse would have to be reversed. By the direction of the column pulses, the plane in which the call-up process is to take place is thus simultaneously selected. Since the sense of direction of the row wires in the arrangement according to FIG. 2, which has been chosen as the example, changes from row to row, the cores are also staggered by 90 degrees on these row wires from row to row. If the storing of an information is to be suppressed at any suitable core arranged within the semi-plane H1, then, by means of the inhibition-pulse generator 1G1, and via the transformer U9, an inhibition pulse is applied to the partial loop J1. This pulse passes through the partial loop J1 in the direction as indicated by the arrows 11. In the example under consideration, in which the call-up pulses are applied to the row wire 4 and to the column wires *c* and *f*, the inhibition pulse prevents the resaturation of the core K*c*4, because the effects of both the row call-up pulse and the inhibition pulse annul each other, as will be immediately recognized from the oppositely directed arrows 10 and 11.

When inhibiting in the semi-plane H2, an inhibition pulse from the inhibition-pulse generator 1G2 is applied via the transformer U8 to the partial loop J2. The controlling of the inhibition generators is effected simultaneously with the selection of the semi-plane, so that no additional control circuits are required, as will be explained in detail hereinafter in connection with the storage system according to FIG. 3.

On account of the fact that the inhibition pulse is only applied to the one or to the other semi-plane, it is possible to avoid the resaturation of the cores during the inhibition process. It is still to be pointed out that, whenever the inhibition wire is simultaneously used as the reading wire in the arrangement according to FIG. 2, the sign of the reading signal is independent of the position of the core within the matrix.

Furthermore, the arrangement according to FIG. 2 bears the advantage that the two semi-planes can be put together along the folding axis *f* (indicated by the dot- and dash-line), so that with respect to the connection of the coils *a* and *h*, *b* and *g*, etc., which are connected in pairs, a particularly favourable wiring will result. It will then also be possible to connect the transformers which are respectively assigned in common to these columns, in a particularly easy way.

Figure 3:
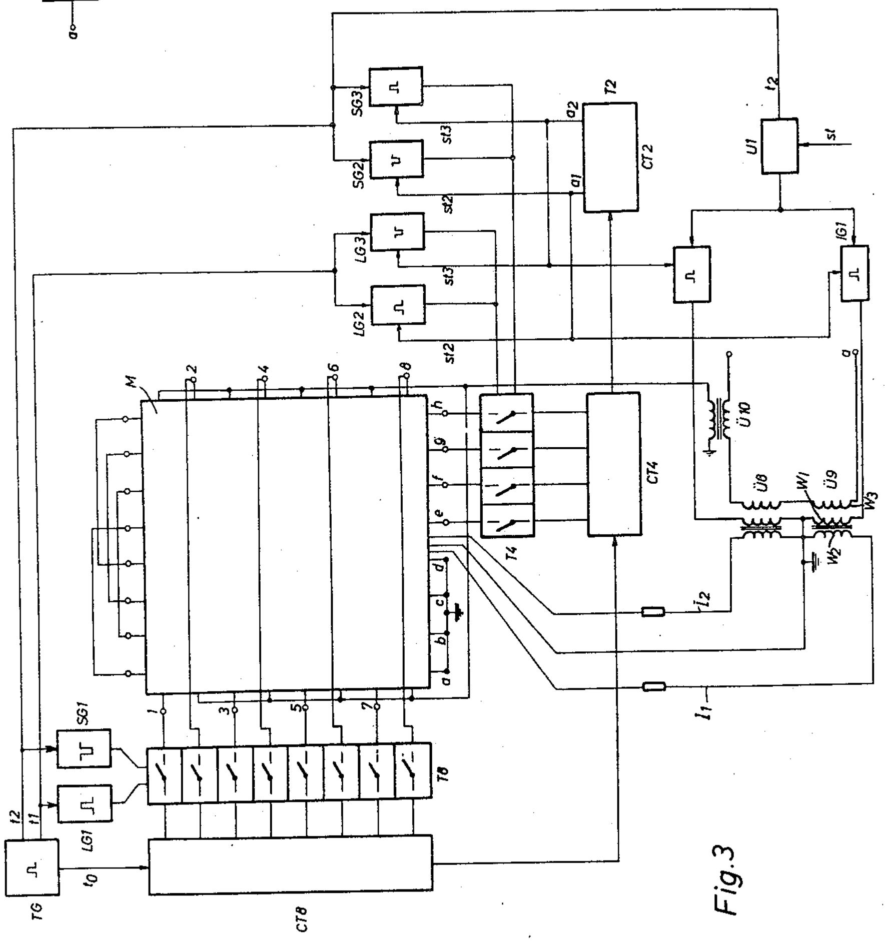
FIG. 3 shows a storage system with an individual core call-up.

In FIG. 3 a storage system is shown for the individual core reading comprising a storage matrix according to FIG. 2. The individual operations are released by a timing generator TG (master clock), delivering periodically repeated clock pulses to three separate outputs in the timely order of succession *t*0, *t*1 and *t*2. The clock pulses are applied to a ring counter CT8 consisting of eight stages. After one complete rotation, the ring counter CT8 applies a stepping pulse to the ring counter CT4 which, in turn, after each complete rotation, delivers a stepping pulse to the ring counter CT2 consisting of two stages. The clock pulses *t*1 are fed to the reading generators LG1, LG2 and LG3; the clock pulses *t*2 are fed to the writing generators SG1, SG2 and SG3 and, via an And-gate U1, they are applied to the inhibition-pulse generators 1G1 and 1G2. The And-gate U1 is opened, e.g., by means of logical switching circuits, and via a control lead *st*, only whenever the call-up process in the storage matrix M is to be inhibited. The row wires 1–8 of the storage matrix M are connected via switching devices T8, with both the reading generator LG1 and with the writing generator SG1. These switching devices are controlled in such a way by the counter CT8 that only that particular switch which is indicated by the counter position will be opened, while all other switching devices will remain blocked.

Accordingly, the column wires *e–h* of the storage matrix M are connected via four switching devices T4 with the reading generators LG2 and LG3, as well as with the writing generators SG2 and SG3. The switching devices T4 are controlled by the ring counter CT4, so that respectively only that particular switching device is opened which is indicated by the position of the counter. The pulse generators LG1, 2, 3 and SG1, 2, 3 are multistable multivibrators. The generators LG1 and SG1 are connected in such a way that responsive to one input pulse they will apply one output pulse via the switching device T8 which is designated or determined by the position of the counter CT8, to the corresponding row wire. The pulse generators LG2, LG3, SG2 and SG3 transfer the call-up pulses via the switching device T4 which is indicated by the position of the counter CT4 to the corresponding column wires. The transmission of a reading or writing pulse is released each time by the respective pulses *t*1 or *t*2 from the master clock TG, but only if at the same time a control potential is applied to the control leads *st*2 or *st*3 respectively, which are connected with the outputs *a*1 and *a*2 of the stages of the counter CT2. The inhibition-pulse generators 1G1 or 1G2 feed the inhibition pulses to the windings W1 of the respective transformers U8 or U9, i.e., only if a corresponding control potential is applied to one of the control leads st2 or st3, and if simultaneously a clock pulse t2 is being applied via U1, so that this gate is opened via the control lead st. The circuit arrangement of the transformers U8 through U10 corresponds to the arrangement according to FIG. 2.

When in the normal condition, the counters CT2, CT4 and CT8 are in the position 1. If now a clock pulse t1 is applied to the reading generators, then the core Ka1 will be called-up. Since the reading generator LG3 is blocked, only from LG2 is a positive reading pulse applied via the first switching device T4 and the column wire e to the column wire a. If an information "1" had been stored in the core Ka1, then this core will be resaturated by the reading pulses and will induce in the partial loop J1 of the reading or inhibition wire, a reading signal which is applied to the outputs a via the transformer U9.

Subsequently to the termination of the reading process, the master clock TG will produce a clock pulse t2 which is adapted to trigger both the writing-pulse generator SG1 and the writing-pulse generator SG2. By means of these generators, negative semi-writing pulses are fed to the row wire 1 and to the column wire a, so that the core Ka1 will be reset again; in other words the information "1" will again be stored. This storing can be inhibited via the inhibition-pulse generator IG1 when applying a corresponding control potential to the control lead st, so that the And-gate U1 will be opened and the clock pulse t2 will trigger the inhibition pulse generator IG1 together with the writing pulse generators.

The subsequently following clock pulse t0 effects the switching of the ring counter CT8 to stage 2. The same process will be repeated with respect to the core Ka2. In the course of the next successive call-up cycles all cores of the column a will be sensed one at a time in turn, until after one complete rotation of CT8 the ring counter CT4 will be switched-on to the stage 2, whereupon the sensing or scanning of all cores contained in the column b is initiated. After one complete rotation of the counter CT4, the counter CT2 will be stepped-on into its position 2, so that with respect to the next successive writing and reading processes the generators LG2–SG2 will be blocked, and the generators LG3 and SG3 will be unblocked. These generators produce pulses of an opposite polarity, so that now the cores in the second semi-plane H2 comprising the column wires e–h will be sensed.

Figure 4:
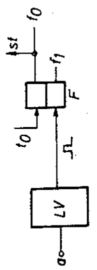
FIG. 4 shows the control arrangement for effecting the re-recording of the read informations.

It has already been mentioned in the foregoing that the inhibition can be controlled via the control lead st and the gating circuit U1 by means of logical circuits (switching circuits). These circuits may serve the information input as well as the regeneration of the read informations. In the following the re-recording of the informations will now be described by way of example. FIG. 4 shows a corresponding control circuit comprising a storage flip-flop F. The terminals a of the output for the reading signals are connected to a reading amplifier LV. The reading signals, as delivered by the reading amplifier, effect the triggering of the flip-flop F into its position $f_1$ whenever the information "1" has been read-out. The output of the flip-flop stage f0 is connected with the control lead st. Accordingly, if the flip-flop F has assumed the position f1, then this indicates that no control signal is applied to the gating circuit U1, and the clock pulse t2 following upon the reading process is incapable of preventing the writing process. Accordingly, another "1" is recorded subsequently thereto. The pulse t0 following after the writing cycle effects the resetting of the flip-flop F to its position f0, so that in the course of the next cycle, during which the next core is being called-up, "0" will be read-out, so that no reading signal at the output of the reading amplifier, and the flip-flop F will remain in its position f0. In this case a control signal is applied to the gate U1 and the next successive clock pulse t2 will be capable of triggering one of the inhibition-pulse generators, so that the next writing process will be inhibited, and no new information "1" can be written-in or stored in the core from which a "0" has been read out.

By means of this storage system there is a saving of 50% of the switching devices normally used for the column call-up purpose. However, two writing and reading generators are required for the columns, and for each storage matrix two inhibition-pulse generators are required. The circuit arrangement is of a particular advantage whenever storage devices comprising a large number of columns. For reasons of simplicity a storage system comprising only one storage matrix has been represented in the drawing of FIG. 3.

While I have described above the principles of my invention in connection with specific apparatus, it is to be clearly understood that this description is made only by way of example and not as a limitation to the scope of my invention as set forth in the objects thereof and in the accompanying claim.

What is claimed is:

A ferrite storage matrix of the type using coincident row and column call-up pulses for saturating selected cores comprising: a plurality of cores arranged in rows and columns having row wires and column wires; said matrix being subdivided into two semi-planes and said column wires being in pairs with the wires of each pair being corresponding wires in different semi-planes; means for saturating a selected core in said matrix comprising, means for feeding a call-up pulse to the row wire passing through said core in a direction to saturate said core, means for feeding a call-up pulse simultaneously to a selected pair of column wires including the column wire which passes through said selected core, said column call-up pulse passing through said last mentioned column wire in a sense to saturate said selected core and through the other wire of said pair in the other sense; means for inhibiting the effect of said call-up pulses on a selected core comprising, a combined inhibition wire and sensing wire for each semi-plane forming a partial loop extending through all the cores of its associated semi-plane, means for feeding an inhibition pulse to the inhibition and sensing wire of the semi-plane containing the selected core in a sense to counteract the call-up pulse on the row wire passing through said core; said means comprising a transformer for each semi-plane capable of transmitting inhibition pulses and receiving sensed pulses, said transformer having three windings, the first winding being the primary winding for inhibition pulses, the second winding being the secondary winding for inhibition pulses and also the primary winding for sensing reading pulses, and the third winding being an output winding for reading pulses; an inhibition pulse generator for each semi-plane, means for connecting the first winding of each transformer to the associated inhibition pulse generator, means for connecting the second winding of each transformer to the associated partial loop, an output circuit, and means for connecting the third winding in series with said output circuit.

References Cited in the file of this patent

UNITED STATES PATENTS

| | | |
|---|---|---|
| 2,897,482 | Rosenberg | July 28, 1959 |
| 2,900,624 | Stuart-Williams et al. | Aug. 18, 1959 |
| 2,902,677 | Counihan | Sept. 1, 1959 |
| 2,908,893 | Rosenberg et al. | Oct. 13, 1959 |
| 2,911,631 | Warren | Nov. 3, 1959 |
| 2,920,315 | Markowitz et al. | Jan. 5, 1960 |